(12) United States Patent
Mycroft et al.

(10) Patent No.: US 7,353,411 B2
(45) Date of Patent: Apr. 1, 2008

(54) POWER EFFICIENCY IN MICROPROCESSORS USING REDUCTION OF HAMMING DISTANCE BETWEEN DATA VALUE

(75) Inventors: Alan Mycroft, Cambridge (GB); Paul Webster, Cambridge (GB); Phil Endecott, Cambridge (GB)

(73) Assignee: AT&T Corp., New York, NY (US)

( * ) Notice: Subject to any disclaimer, the term of this patent is extended or adjusted under 35 U.S.C. 154(b) by 283 days.

(21) Appl. No.: 10/478,168

(22) PCT Filed: May 2, 2002
(Under 37 CFR 1.47)

(86) PCT No.: PCT/GB02/02034

§ 371 (c)(1),
(2), (4) Date: Aug. 25, 2004

(87) PCT Pub. No.: WO02/095574

PCT Pub. Date: Nov. 28, 2002

(65) Prior Publication Data

US 2005/0022041 A1    Jan. 27, 2005

(30) Foreign Application Priority Data

May 19, 2001 (GB) .................. 0112276.1

(51) Int. Cl.
G06F 1/00 (2006.01)
G06F 1/26 (2006.01)
G06F 1/32 (2006.01)
(52) U.S. Cl. ..................... 713/320; 713/300
(58) Field of Classification Search ........... 713/300, 713/320
See application file for complete search history.

(56) References Cited

U.S. PATENT DOCUMENTS

| 5,790,874 | A | | 8/1998 | Takano et al. |
| 5,854,935 | A | * | 12/1998 | Enomoto ................ 717/159 |
| 6,002,878 | A | * | 12/1999 | Gehman et al. .......... 713/340 |
| 6,725,450 | B1 | * | 4/2004 | Takayama ................ 717/139 |

FOREIGN PATENT DOCUMENTS

EP    0 926 596 A    6/1999

OTHER PUBLICATIONS

Givargis T et al: "Interface exploration for reduced poser in core-based systems" System Synthesis, 1998. Proceedings, 11TH International Symposium on Hsinchu, Taiwan Dec. 2-4, 1998 Los Alamitos, CA, USA, IEEE Comput Soc. US, p. 118, left col. see "don't care padding" (Dec. 2, 1998).
Doehle L et al: "Non-Redundant Instruction Format for Interpretive Programming Languages" IBM Technical Disclosure Bulletin IBM Corp., New York, US vol. 17, No. 8, whole doc (Jan. 1975).

* cited by examiner

Primary Examiner—James K Trujillo

(57) ABSTRACT

A method of reducing the power consumption of microprocessor system is provided, wherein: said microprocessor system comprises a microprocessor (2) and a memory (4) connected by a bus (6); said memory (4) contains a plurality of data values, each represented by a number of bits, for transmission to said microprocessor (2) via the bus (6); and at least some of said data values contain unused bits; and wherein said method includes assigning values to said unused bits in such a way as to reduce the Hamming distance between successive data values by a greater extent than setting all of said unused bits to an arbitrary predetermined value.

20 Claims, 1 Drawing Sheet

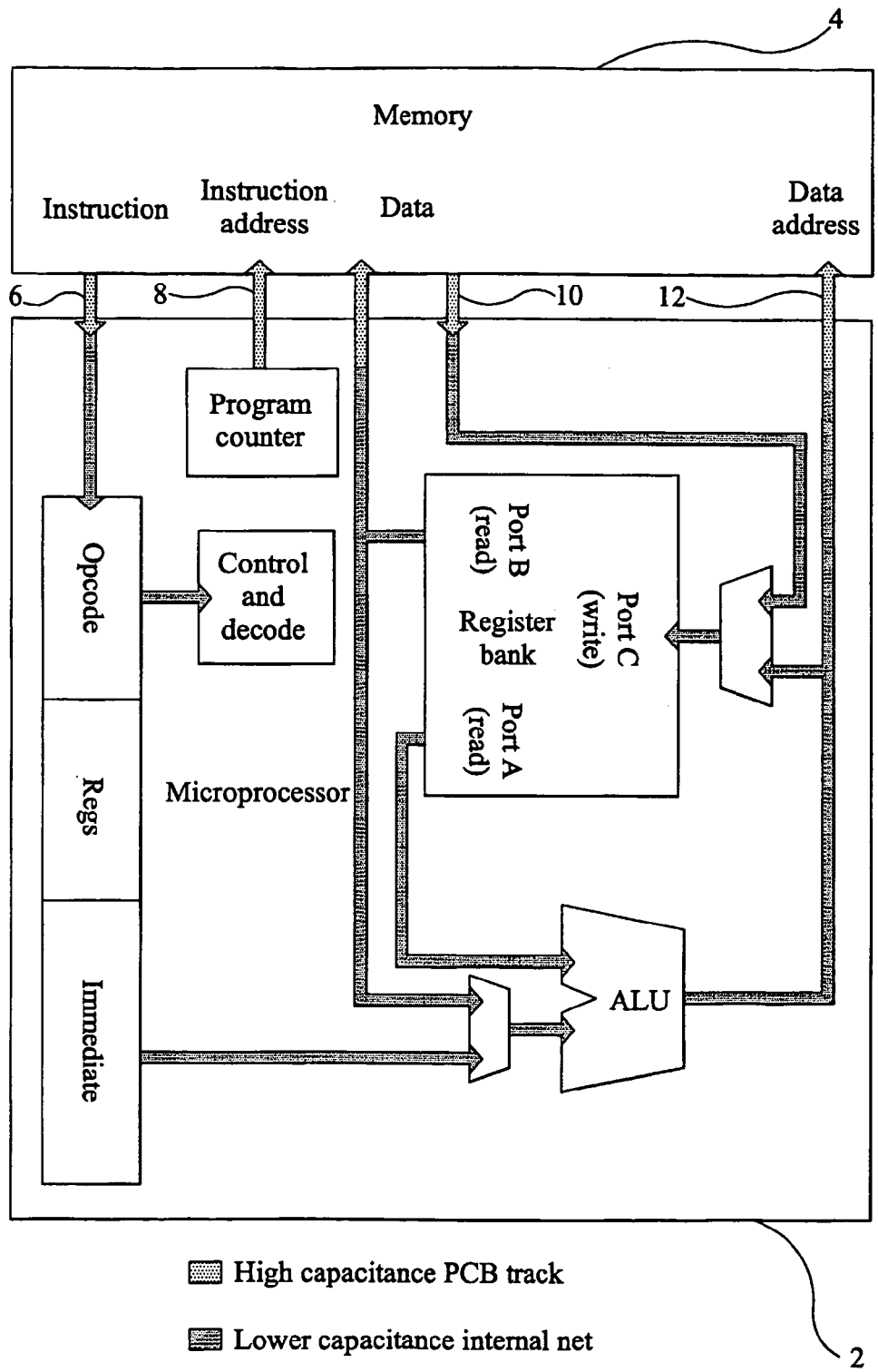

POWER EFFICIENCY IN MICROPROCESSORS USING REDUCTION OF HAMMING DISTANCE BETWEEN DATA VALUE

CROSS-REFERENCE TO RELATED APPLICATIONS

This application claims the benefit of International Patent Application Number PCT/GB02/02034, filed May 2, 2002, which claims priority to Great Britain Patent Application No. 0112276.1, filed May 19, 2001.

BACKGROUND OF THE INVENTION (1) Field of the Invention

The invention relates to improved power efficiency in microprocessors.

The concept of Hamming distance will first be described. The Hamming distance between two binary numbers is the count of the number of bits that differ between them. For example:

| Numbers in decimal | Numbers in binary (inc. leading zeros) | Hamming distance |
|---|---|---|
| 4 and 5 | 0100 and 0101 | 1 |
| 7 and 10 | 0111 and 1010 | 3 |
| 0 and 15 | 0000 and 1111 | 4 |

(2) Description of Related Art

Hamming distance is related to power efficiency because of the way that binary numbers are represented by electrical signals. Typically a steady low voltage on a wire represents a binary 0 bit and a steady high voltage represents a binary 1 bit. A number will be represented using these voltage levels on a group of wires, with one wire per bit. Such a group of wires is called a bus. Energy is used when the voltage on a wire is changed. The amount of energy depends on the magnitude of the voltage change and the capacitance of the wire. The capacitance depends to a large extent on the physical dimensions of the wire. So when the number represented by a bus changes, the energy consumed depends on the number of bits that have changed—the Hamming distance—between the old and the new value, and on the capacitance of the wires.

If one can reduce the average Hamming distance between successive values on a high-capacitance bus, keeping all other aspects of the system the same, the system's power efficiency will have been increased.

The capacitance of wires internal to an integrated circuit is small compared to the capacitance of wires fabricated on a printed circuit board due to the larger physical dimensions of the latter.

EP 0,926,596 describes a method of optimizing assembly code of a VLIW processor or other processor that uses multiple-instruction words, each of which comprise instructions to be executed on different functional units of the processor.

EP 0,926,596 describes a method of optimizing assembly code of a VLIW processor or other processor that uses multiple-instruction words, each of which comprise instructions to be executed on different functional units of the processor.

BRIEF SUMMARY OF THE INVENTION

According to the invention there is provided a method of reducing the power consumption of a microprocessor system, a memory, a computer readable medium, computer programs, and a microprocessor system, as set out in the accompanying claims.

BRIEF DESCRIPTION OF THE DRAWINGS

Embodiments of the invention will now be described, by way of example only, with reference to the accompanying figure, which shows the interconnections between a microprocessor and its memory.

DETAILED DESCRIPTION OF THE INVENTION

In the accompanying figure, a microprocessor 2 is connected to memory 4 by a number of buses which are implemented on a printed circuit board (not shown).

The embodiments described here aim to reduce the average Hamming distance between successive values on the microprocessor-memory interface buses, shown as the lighter colored nets 6, 8, 10 and 12 in FIG. 1, as this will have a significant influence on power efficiency.

Even in systems where microprocessor and memory are incorporated into the same integrated circuit the capacitance of the wires connecting them will be larger than average, so even in this case reduction of average Hamming distance on the microprocessor-memory interface is worthwhile.

Processor-memory communications perform two tasks. Firstly, the processor fetches its program from the memory, one instruction at a time. Secondly, the data that the program is operating on is transferred back and forth. The embodiments described here focus on instruction fetch, which makes up the majority of the processor-memory communications, but the invention is by no means limited to instruction fetch.

The instruction fetch bus 6 is the bus on which instructions are communicated from the memory 4 to the processor 2. Embodiments described here aim to reduce the average Hamming distance on this bus, i.e. to reduce the average Hamming distance from one instruction to the next.

It is common for instruction sets to be redundant, i.e. for instructions to contain information that is ignored by the processor. In particular some instructions contain unused bits.

For example in the instruction set considered here all instructions are 32 bits long. There are three instruction formats:

| 31 | . | . | . | . | . | . | . | . | . | . | . | . | . | . | . | . | . | . | . | . | . | . | . | . | . | . | . | . | . | . | 0 |
|---|---|---|---|---|---|---|---|---|---|---|---|---|---|---|---|---|---|---|---|---|---|---|---|---|---|---|---|---|---|---|---|

Bit Number

| X | <Opcode> | <Immediate26> | | | | | |
|---|---|---|---|---|---|---|---|
| X | <Opcode> | <Reg1> | <Reg2> | <Immediate16> | | | |
| X | <Opcode> | <Reg1> | <Reg2> | X X X X X | <Opcode> | <Reg3> | |

Bits marked 'X' are unused bits. The other bits convey useful information to the processor 2.

In two of these formats, 31 of the 32 bits are used. In the third format, 26 of the 32 bits are used. The remaining six bits are completely ignored by the processor 2. Some further features of our illustrative instruction set mean that other bits will also sometimes be unused, but the exact details of this have been omitted for clarity.

Any or all of the unused bits can be assigned to a combination of '0's or '1's without changing the meaning of the program.

Many other common processor 2 instruction sets also have unused bits. Typically, existing compiler tool chains will set all of the unused bits to '0'.

Although the processor 2 ignores these bits, they still contribute to the average Hamming distance for instruction fetches. The embodiments described here assign values to unused bits in a way that reduces the Hamming distance and hence maximizes the power efficiency.

For example, consider the following sequence of three instructions:
A: x011000011010001101000110100111
B: x000000010011110xxxxx01101100011
C: x000110111100011110011001011100

Note the group of unused bits, marked 'xxxxx' in instruction B. A conventional system might set all unused bits to '0' giving the following code:
A: 0011100001101000110100011010111
B: 00000000100111100000001101100011
C: 00001101111000111100110011011100

The Hamming distances between these instructions are:
From A to B: 16
From B to C: 22

One embodiment described here instead gives the unused bits the following values:
A: 00111000011010001101000110100111
B: 00000000100111101101001101100011
C: 00001101111000111100110011011100

In this case the Hamming distances have been reduced to:
From A to B: 13
From B to C: 21

This technique does not require any modifications to the microprocessor 2. Power is saved through only changing the program bit pattern.

A first embodiment of the invention uses the following method for assigning unused bits in a sequence of instructions:
For the first instruction in the program, set any unused bits to 0.
Considering each subsequent instruction in the program sequentially:
Considering each bit in this instruction:
If this bit is unused, assign the value of the corresponding bit from the previous instruction to it.

An example of this method will now be given using the following sequence of 8-bit instructions:
Bit number: 76543210
01x01x01
x001x010
xx000x1x
00x1x100
1x001x00
1x001x00
00001x00
01x0xx10
10000xx1
01x100x0
1x1x00x0
01x01000
xx001x0x
110x01x0

The changes to the bits of the first three instructions will now be given in detail.

The first instruction is 01x01x01.

| | | |
|---|---|---|
| Bit 7 of instruction is 0 | ⇒ | Do nothing |
| Bit 6 of instruction is 1 | ⇒ | Do nothing |
| Bit 5 of instruction is X | ⇒ | Set it to 0 |
| Bit 4 of instruction is 0 | ⇒ | Do nothing |
| Bit 3 of instruction is 1 | ⇒ | Do nothing |
| Bit 2 of instruction is X | ⇒ | Set it to 0 |
| Bit 1 of instruction is 0 | ⇒ | Do nothing |
| Bit 0 of instruction is 1 | ⇒ | Do nothing |

After processing the first instruction it has been changed to 01001001.

The second instruction is x001x010.

| | | |
|---|---|---|
| Bit 7 of instruction is X | ⇒ | Set it to 0 (Copied from bit 7 of first instruction) |
| Bit 6 of instruction is 0 | ⇒ | Do nothing |
| Bit 5 of instruction is 0 | ⇒ | Do nothing |
| Bit 4 of instruction is 1 | ⇒ | Do nothing |
| Bit 3 of instruction is X | ⇒ | Set it to 1 (Copied from bit 3 of first instruction) |
| Bit 2 of instruction is 0 | ⇒ | Do nothing |
| Bit 1 of instruction is 1 | ⇒ | Do nothing |
| Bit 0 of instruction is 0 | ⇒ | Do nothing |

After processing the second instruction it has been changed to 00011010.

The third instruction is xx000x1x.

| | | |
|---|---|---|
| Bit 7 of instruction is X | ⇒ | Set it to 0 (Copied from bit 7 of second instruction) |

-continued

| | | |
|---|---|---|
| Bit 6 of instruction is X | ⇒ | Set it to 0 (Copied from bit 6 of second instruction) |
| Bit 5 of instruction is 0 | ⇒ | Do nothing |
| Bit 4 of instruction is 0 | ⇒ | Do nothing |
| Bit 3 of instruction is 0 | ⇒ | Do nothing |
| Bit 2 of instruction is X | ⇒ | Set it to 0 (Copied from bit 2 of second instruction) |
| Bit 1 of instruction is 1 | ⇒ | Do nothing |
| Bit 0 of instruction is X | ⇒ | Set it to 0 (Copied from bit 0 of second instruction) |

After processing the third instruction it has been changed to 00000010.

The complete sequence of output instructions, after processing according to the method of the first embodiment, is given in the following table.

| Input instruction | Output instruction |
|---|---|
| 00X1X100 | 00010100 |
| 1X001X00 | 10001100 |
| 1X001X00 | 10001100 |
| 00001X00 | 00001100 |
| 01X0XX10 | 01001110 |
| 10000XX1 | 10000111 |
| 01X100X0 | 01010010 |
| 1X1X00X0 | 11110010 |
| 01X01000 | 01101000 |
| XX001X0X | 01001000 |
| 110X01X0 | 11000100 |

In this example, the mean inter-instruction Hamming distance after the unused bits have been assigned is 2.61. If all unused bits had been assigned to zero, then the mean inter-instruction Hamming distance would be 2.92, indicating a power saving of around 5%.

This method produces optimal results for straight-line code, i.e. code that has no branches in the flow-of-control. To take into account non-linear flow-of-control a more sophisticated method is required, as will be described below.

The following table shows an example of a fragment of pseudo high-level code and corresponding psuedo assembly language instructions:

| | | |
|---|---|---|
| if a=1 then | Compare a with 1 | (1) |
| b:=0; | Branch, if not equal, to L1 | (2) |
| else | set b to 0 | (3) |
| c:=1; | jump to L2 | (4) |
| end if; | L1: set c to 1 | (5) |
| d:=d+1; | L2: add 1 to d | (6) |
| e:=a; | set e to a | (7) |

There are two possible paths that control-flow can take through this code. If a is equal to 1 then the sequence of instructions executed is 1⇒2⇒3⇒4⇒6⇒7. If a is not equal to 1 then the sequence is 1⇒2⇒5⇒6⇒7.

The simple algorithm presented above would assign unused bits as if the execution sequence were 1⇒2⇒3⇒4⇒5⇒6⇒7. This is not necessarily the optimal assignment for either of the actual execution sequences.

A second embodiment of the invention incorporates an unused bit assignment method that takes into account flow of control.

When an unused bit is both preceded and followed by used bits in the adjacent instructions, setting the unused bit to the value of either the preceding bit or the following bit will optimise Hamming distance. For example:

| | Preceding bit | Unused bit | Following bit |
|---|---|---|---|
| A: | 0 | X | 1 |
| B: | 1 | X | 1 |

In example A, the value of the preceding bit can be copied into the unused bit giving the bit-sequence 001, or the value of the following bit can be copied into the unused bit giving the bit-sequence 011. In both cases there is exactly one transition overall. In example B, whichever bit's value is copied into the unused bit it will be a 1, giving no transitions in either case.

The first embodiment described above always copies from the preceding instruction. A modification of the first embodiment could run in reverse and always copy from the following instruction. The method of the second embodiment may copy from either.

In the example, instruction 2 is a point of divergence, because the following instruction can be either instruction 3 or instruction 5. Instruction 6 is a point of convergence, because the preceding instruction can be either instruction 4 or instruction 5.

Instructions at points of convergence have more than one possible preceding instruction. If we used only preceding instructions to determine how to assign unused bits we would have to make a decision about which of the two possible preceding instruction to use. Instead in these cases we can use the following instruction as the basis for unused bit assignment. So in the example, unused bits in instruction 6 are filled in from instruction 7.

The method of the second embodiment is based on the following three rules:

1) If an instruction has more than one preceding instruction, i.e. it is at a point of convergence, assign unused bits based on the following instruction.
2) If an instruction has more than one following instruction, i.e. it is at a point of divergence, assign unused bits based on the preceding instruction.
3) If an instruction has exactly one preceding and exactly one following instruction, i.e. it is neither a point of convergence nor of divergence, then assign unused bits based on either the preceding or the following instruction.

The following table shows how this can be applied to the example shown above:

| | Possible preceding instructions | Possible following instructions | Assign unused bits based on |
|---|---|---|---|
| compare 'a' with 1 (1) | (None) | 2 | 2 |
| branch if not equal, to L1 (2) | 1 | 3, 5 | 1 |
| set 'b' to 0 (3) | 2 | 4 | 2 or 4 |
| jump to L2 (4) | 3 | 6 | 3 or 6 |
| L1: set 'c' to 1 (5) | 2 | 6 | 2 or 6 |
| L2: add 1 to 'd' (6) | 4, 5 | 7 | 7 |
| set 'e' to 'a' (7) | 6 | (None) | 6 |

In a variant embodiment an instruction's unused bits are based on a non-adjacent instruction. For example, instruction (5) could be based on instruction (2). This will typically occur at the target of an unconditional branch. In an implementation of this algorithm, such an assignment may be less practical than an assignment from an adjacent instruction because it requires that the implementation compute the target of the branch. In some cases, this may even be impossible, particularly when the branch target is computed at run time.

The following are hypothetical machine code bit patterns corresponding to these instructions, including some unused bits:

| | | |
|---|---|---|
| Compare a with 1 | 00001X00 | (1) |
| Branch if not equal to L1 | 01X0XX10 | (2) |
| Set b to 0 | 10000XX1 | (3) |
| Jump L2 | 01X100X0 | (4) |
| Set c to 1 | 1X1X00X0 | (5) |
| Add 1 to d | 01X01000 | (6) |
| Set e to a | XX001X0X | (7) |

In accordance with the second embodiment, combining the above two tables gives the following assignments for unused bits, in which the arrows show how unused bits are assigned from adjacent instructions.

```
       7 6 5 4 3 2 1 0   (Bit Number)
(1)  [ 0 0 0 0 1 X 0 0 ]  Instruction (1)
         ⇓     ⇓ ⇓⇑       based on instuction (2)

(2)  [ 0 1 X 0 X X 1 0 ]  Instruction (2)
           ⇓ ⇓            based on instuction (1)

(3)  [ 1 0 0 0 0 X X 1 ]  Instruction (3)
         ⇓       ⇑ ⇓⇓     based on instuctions (2) and (4)

(4)  [ 0 1 X 1 0 0 X 0 ]  Instruction (4)
                          based on instuction (3)

(5)  [ 1 X 1 X 0 0 X 0 ]  Instruction (5)
       ⇑   ⇑     ⇑        based on instuction (6)

(6)  [ 0 1 X 0 1 0 0 0 ]  Instruction (6)
       ⇓ ⇓ ⇑   ⇓   ⇓      based on instuction (7)

(7)  [ X X 0 0 1 X 0 X ]  Instruction (7)
                          based on instuction (6)
```

Where an arrow joins a used bit to an unused bit the unused bit can be assigned from that used bit. For example, bit 3 of instruction (2) can be assigned from bit 3 of instruction (1). When a used bit is connected to an unused bit, and that unused bit is connected in turn to other unused bits, the value can be propagated to all of them. For example, bit 1 of instruction (2) can be propagated to unused bit 1 in instructions (3) and (4).

Here is the complete list of the assignments in accordance with the second embodiment:

```
       7 6 5 4 3 2 1 0   (Bit Number)
(1)  [ 0 0 0 0 1 X 0 0 ]
         ⇓     ⇓ ⇓⇑

(2)  [ 0 1 0 0 1 X 1 0 ]  Bit 3 assigned from instruction (1)
         ⇓ ⇓              Bit 5 assigned from instruction (1)

(3)  [ 1 0 0 0 0 0 1 1 ]  Bit 1 assigned from instruction (2)
         ⇓       ⇑ ⇓⇓     Bit 2 assigned from instruction (4)

(4)  [ 0 1 0 1 0 0 1 0 ]  Bit 5 assigned from instruction (3)
                          Bit 1 assigned from instruction (2)
                          via instruction (3)

(5)  [ 1 1 1 0 0 0 0 0 ]  Bit 6 assigned from instruction (6)
       ⇑   ⇑     ⇑        Bit 4 assigned from instruction (6)
                          Bit 1 assigned from instruction (6)

(6)  [ 0 1 0 0 1 0 0 0 ]  Bit 5 assigned from instruction (7)
       ⇓ ⇓ ⇑   ⇓   ⇓

(7)  [ 0 1 0 0 1 0 0 0 ]  Bit 7 assigned from instruction (6)
                          Bit 6 assigned from instruction (6)
                          Bit 2 assigned from instruction (6)
                          Bit 0 assigned from instruction (6)
```

Some unused bits can remain unassigned after the method of the second embodiment has been carried out. This will occur when a bit is unused in all instructions between a point of convergence and a point of divergence. In the example, bit 2 of instructions (1) and (2) are unassigned for this reason. A third embodiment, given later, will "seed" the group of unused bits using a used bit in an adjacent instruction. In this example, bit 2 of instruction (2) could be seeded with a '0' from instruction (3).

The mean inter-instruction Hamming distances for this example are:

| | Mean Hamming distance with unused bits . . . | | |
|---|---|---|---|
| Instruction sequence | All set to '0' | Set using first (simple) algorithm | Set taking flow of control into account |
| 1⇒2⇒3⇒4⇒6⇒7 | 2.80 | 3.0 | 2.60 |
| 1⇒2⇒5⇒6⇒7 | 3.00 | 2.75 | 2.25 |
| Mean, assuming sequences are equally probable | 2.90 | 2.88 | 2.43 |

Difficulties arise when an instruction is both a point of convergence and a point of divergence. This will occur when a branch instruction leads to another branch instruction. The example in the following table illustrates this.

| | |
|---|---|
| (1) | ... ... ... ...<br>jump L1 |
| (2) | ... ... ... ...<br>jump L1 |
| (3) | ... ... ... ... |
| (4) | L1:<br>branch if negative, to L2 |
| (5) | ... ... ... ... |
| (6) | L2: |

Possible paths through this code are:

| | |
|---|---|
| (1)⇨(4)⇨(5) | (1)⇨(4)⇨(6) |
| (2)⇨(4)⇨(5) | (2)⇨(4)⇨(6) |
| (3)⇨(4)⇨(5) | (3)⇨(4)⇨(6) |

Instruction (4) is a point of both convergence and divergence, and the embodiments described so far offer no instruction on which it should base any unused bits that it may contain.

In a further variant embodiment, unused bit assignment is based on the values of bits in the multiple preceding and following instructions. In general an optimal assignment requires knowledge of the relative probabilities of each path. However if all of the preceding instructions, or all of the following instructions, are known and have the same bit value an optimal assignment is still possible. The third embodiment given later simply copies a value from an adjacent instruction.

Many processors incorporate an architectural feature called pipelining that affects the sequence in which instructions are fetched. In a pipelined processor, one or more instructions sequentially after a branch instruction will be fetched and then discarded if the branch is taken. For the purposes of this analysis these instruction fetches are as important as any other and need to be taken into account.

Considering the same example as before:

| | |
|---|---|
| Compare a with 1 | (1) |
| Branch if not equal to L1 | (2) |
| set b to 0 | (3) |
| Jump to L2 | (4) |
| L1: set c to 1 | (5) |
| L2: add 1 to d | (6) |
| set e to a | (7) |

In a non-pipelined processor, the possible execution sequences for this code are 1⇨2⇨5⇨6⇨7 and 1⇨2⇨3⇨4⇨6⇨7. For a pipelined processor that fetches one extra instruction after taken branches the possible execution sequences are 1⇨2⇨[3]⇨5⇨6⇨7 and 1⇨2⇨3⇨4⇨[5]⇨6⇨7, where [n] indicates the fetched-but-discarded instruction.

The second and third embodiments can function correctly for pipelined processors with only a minor change. "Points of divergence", which were previously considered to be branch instructions, arm now the instructions an appropriate distance after the branch instructions.

The method of the third embodiment can be summarised by the following set of instructions.

Let C be the set of instructions that are at points of convergence. This means all instructions that are labelled as branch targets.

Let D be the set of instructions that are at points of divergence. This means all branch instructions, or if pipelining is being taken into account, all instructions that are the appropriate distance after a branch instruction.

Let E be the set of pairs (I, J) where I and J are instructions that satisfy either or both of the following conditions:
  J is not an element of C, and I immediately precedes J
  J is not an element of D, and I immediately follows J (Note: Each element of E corresponds to an arrow in figure, with I being the instruction at the tail of the arrow and J being the instruction at the head of the arrow).

For each bit in turn:

```
Let B be the bit-number of the current bit
While there are any instructions where bit B is unused
    While there is an element (I, J) of E, such that bit B of instruction
    J is unused and bit B of I is used
        Set bit B of instruction J to the value of bit B of
        instruction I
    End-while
    If there are still any instructions where bit B is unused
    (Note: This step implements the "seeding" process mentioned earlier)
        Find any two instructions I and J, such that bit B of
        instruction I is used, bit B of J is unused, and I and J are
        adjacent instructions [for the purposes of this step, the
        first instruction in the program should be considered to be
        preceded by and the last instruction followed by an
        instruction containing all zeros]
        Set bit B of instruction J to the value of bit B of
        instruction I
    End-if
End-while
End-for
```

The invention claimed is:

1. A method of reducing the power consumption of a microprocessor system which comprises a microprocessor and a memory connected by at least one bus, said memory containing a plurality of data values, each represented by a number of bits, for transmission to said microprocessor via said at least one bus, and at least some of said data values containing unused bits,
   said method including assigning values to said unused bits in such a way as to reduce the Hamming distance between successive data values by a greater extent than setting all of said unused bits to an arbitrary predetermined value;
   said method further including:
      setting unused bits in an initial data value to a predetermined bit value; and
      considering each remaining data value in sequence, assigning a bit value to each unused bit, the assigned bit value being equal to a bit value of a corresponding bit in a previously considered data value.

2. A method as claimed in claim 1, wherein said considered data value is adjacent to said previously considered data value in said memory.

3. A method as claimed in claim 1, wherein said considered data value is adjacent to said previously considered data value in the sequence in which said data values are read from said memory.

4. A method as claimed in claim 1, wherein said considered data value precedes said previously considered data value.

5. A method as claimed in claim 1, wherein said considered data value follows said previously considered data value.

6. A method as claimed in claim 1, wherein said data values represent instructions to said microprocessor.

7. A method as claimed in claim 6, which further comprises the step of determining whether each instruction is a point of convergence.

8. A method as claimed in claim 7, wherein for instructions which are points of convergence, assignment of unused bits in the instruction is based on the following instruction.

9. A method as claimed in claim 6, wherein for instructions which have only one possible preceding instruction and one possible following instruction, assignment of unused bits in the instruction is based on either the preceding or the following instruction.

10. A method as claimed in claim 6, wherein in the case of an instruction which is both a point of divergence and a point of convergence, assignment of unused bits in the instruction is based on a consideration of bits in multiple preceding and following instructions.

11. A method as claimed in claim 10, wherein assignment of unused bits in the instruction is based on a consideration of the probabilities of different paths to and from said instruction.

12. A method as claimed in claim 10, wherein assignment of unused bits in the instruction is simply based on an adjacent instruction.

13. A method as claimed in claim 6, wherein if any unused bits remain unassigned after the method has been carried out, then these unused bits are seeded using the corresponding bits from an adjacent instruction.

14. A method as claimed in claim 6, which further comprises the step of determining whether each instruction is a point of divergence.

15. A method as claimed in claim 14, wherein if said microprocessor employs pipelining, then points of divergence are considered to be the instructions an appropriate distance after branch instructions.

16. A method as claimed in claim 14, wherein for instructions which are points of divergence, assignment of unused bits in the instruction is based on the preceding instruction.

17. A method of reducing the power consumption of a microprocessor system which comprises a microprocessor and a memory connected by at least one bus, said memory containing a plurality of data values, each represented by a number of bits, for transmission to said microprocessor via said at least one bus, and at least some of said data values containing unused bits, said method including assigning values to said unused bits in such a way as to reduce the Hamming distance between successive data values by a greater extent than setting all of said unused bits to an arbitrary predetermined value, said microprocessor system employing a pipelining architectural feature, wherein said data values represent instructions to said microprocessor, and wherein said method further comprises the step of determining whether each instruction is a point of divergence, the point of divergence being considered to be the instructions an appropriate distance after branch instructions.

18. A method as claimed in claim 17, further comprising the steps of:

considering each bit of each data value in turn and, if a particular bit of the considered data value is unused, assigning to said particular bit the value of the corresponding bit from an adjacent data value.

19. A method as claimed in claim 18, wherein said adjacent data value precedes said considered data value.

20. A method as claimed in claim 18, wherein said adjacent data value follows said considered data value.

* * * * *